J. B. SCHUMAN.
FEEDER FOR CORN HUSKERS AND SHREDDERS.
APPLICATION FILED MAY 6, 1912.

1,104,738.

Patented July 21, 1914.

2 SHEETS—SHEET 2.

Witnesses:
Adelaide Kearns
Elora Diller

Inventor
James B. Schuman,
By James A. Walsh,
Attorney.

UNITED STATES PATENT OFFICE.

JAMES B. SCHUMAN, OF INDIANAPOLIS, INDIANA, ASSIGNOR TO THE SCHUMAN COMPANY, OF INDIANAPOLIS, INDIANA, A CORPORATION OF MAINE.

FEEDER FOR CORN HUSKERS AND SHREDDERS.

1,104,738.　　　　　Specification of Letters Patent.　　Patented July 21, 1914.

Application filed May 6, 1912.　Serial No. 695,394.

*To all whom it may concern:*

Be it known that I, JAMES B. SCHUMAN, a citizen of the United States, residing at Indianapolis, in the county of Marion and State of Indiana, have invented certain new and useful Improvements in Feeders for Corn Huskers and Shredders, of which the following is a specification.

My present invention relates to improvements in feeders for corn huskers and shredders, and is especially adapted for handling corn shocks as units, which may be elevated thereto by any suitable hoisting device, such for instance as that which is the subject of Letters Patent No. 990,785, issued April 25, 1911, upon my application.

By my improved feeder the material can be forwarded toward the feeding rolls of the shredder to within convenient reach of the operator as desired by him, and the same is so arranged as to permit him to occupy a position near the rolls without danger of accident, the material being so presented in front of the operator as to enable him to grasp and feed the same to the rolls without stooping or changing his position. In the operation of a corn husker and shredder, it will be understood, that in order to do so profitably it is necessary that material in sufficient quantities be constantly fed thereto, otherwise the machinery and operators become idle from time to time, and by providing a feeder for supporting a complete shock and conveying it to the rolls to be stripped by the operators I am enabled as such shock becomes exhausted to have another complete shock on the feeder in readiness to be advanced and fed to the rolls, so that there is a continuous supply of material in convenient position to be fed to the rolls at all times until a job is completed.

Figure 1:
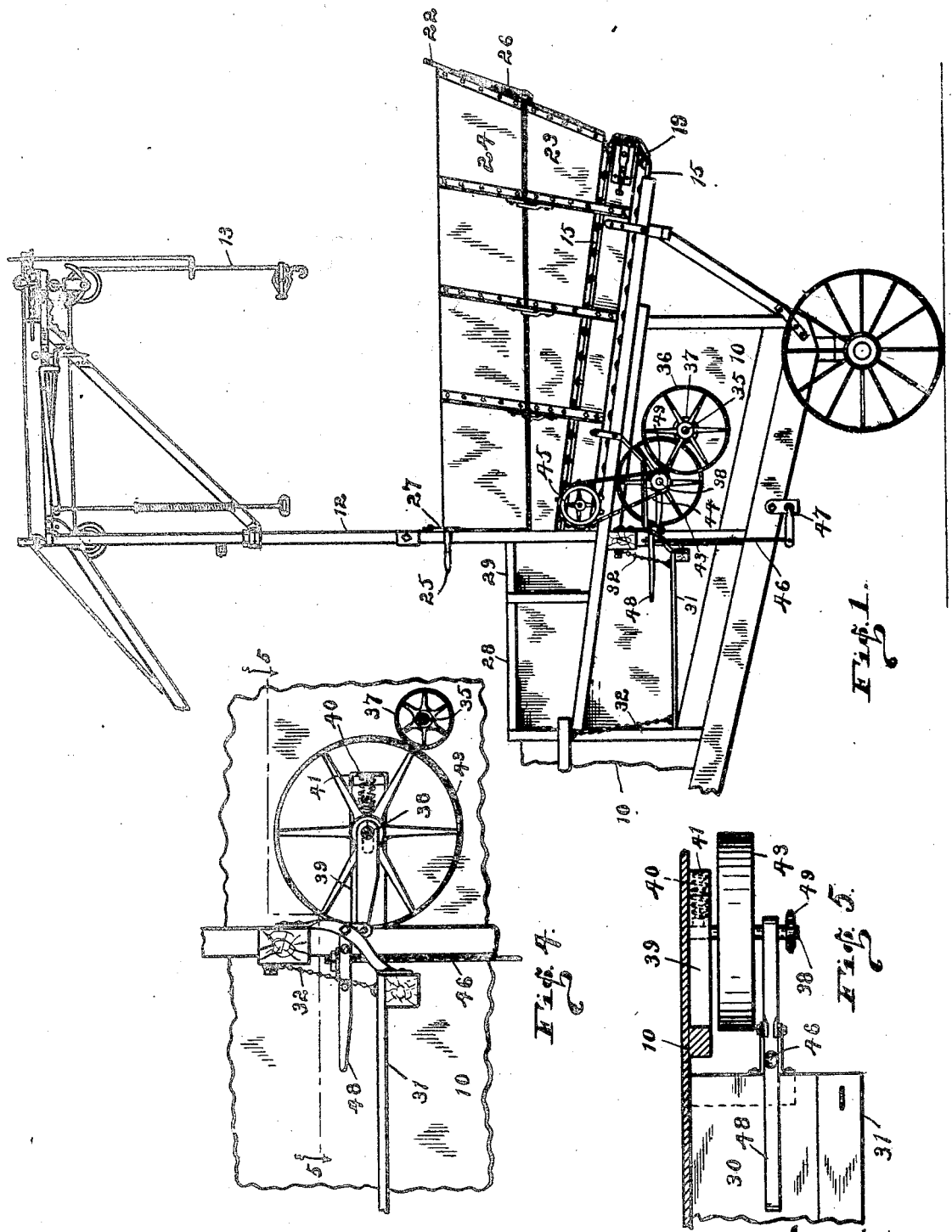
Figure 2:
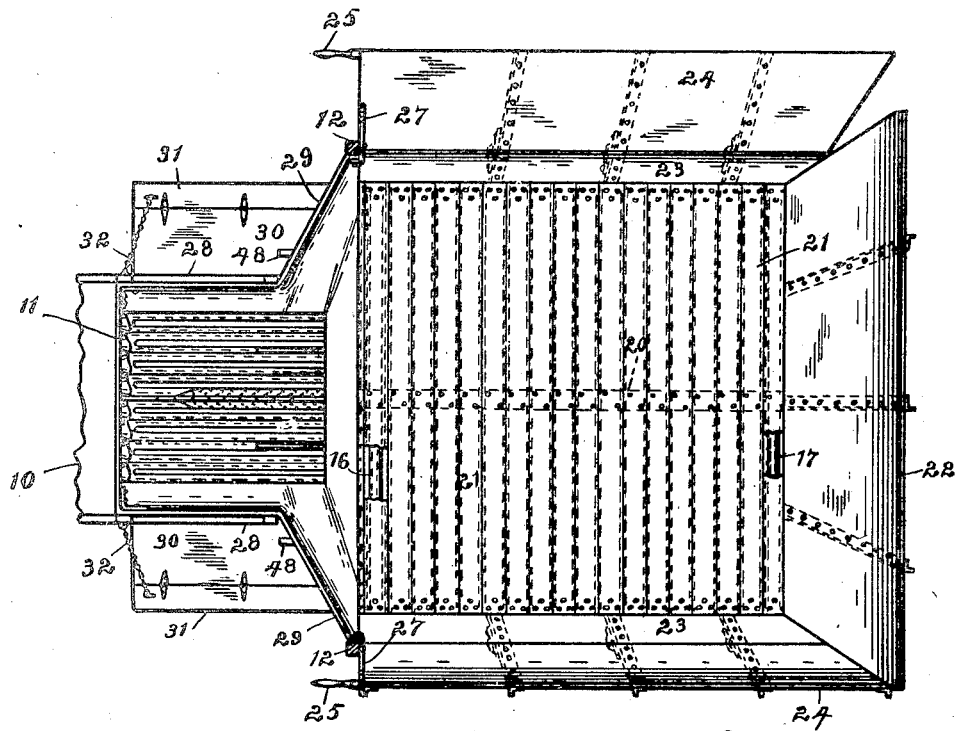
Figure 3:
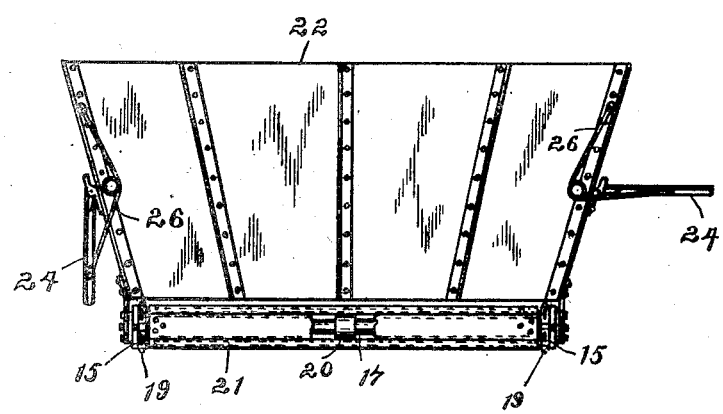

In the accompanying drawings, which are made a part hereof, Figure 1 is a side elevation of a shredder in fragment equipped with my improved feeder and a hoist of the character hereinbefore indicated; Fig. 2 a plan; Fig. 3 an end view of said feeder; and Figs. 4 and 5 detail views of certain portions of my improved feeding arrangement.

In said drawings the portions marked 10 indicate a shredding machine, 11, the rolls thereof which are appropriately designed to treat material delivered thereinto, and 12, and 13, is a hoisting device arranged to grapple shocks which have been deposited upon the ground, draw them to and elevate them above the machine to be deposited thereon as required in position to be fed to the rolls.

My improved feeder is secured to the shredder in any appropriate manner, and consists of an endless carrier comprising link or other belts, as 15, mounted on transverse rolls, 16, and 17, said rolls embodying suitable sprockets, as 19, Fig. 1, about which said belts travel. As will be understood, I preferably employ two of these belts, and also midway between them mount an idler belt, 20, on said rolls 16, and 17, and secure to said belts transverse cross members constituting a substantially imperforate floor, 21, and which floor will be hereinafter referred to as the carrier. At the rear and each side of said feeder, which latter is preferably inclined, I provide end and side shock retaining walls 22, and 23, respectively, the side walls comprising the lower rigid members, 23, and upper hinged members, 24, each of the latter having a handle, 25. Said hinged members are preferably connected at their rear ends to the end wall, 22, by springs, 26, by which they are permitted to assume and be retained in any desired position relative to the lower members, that is, they may either project out laterally or be brought to their lowermost position, as indicated in Fig. 3, and when returned to normal position are retained by a suitable catch, as 27, pivoted to hoist 12, all for a purpose which will hereinafter appear. From the forward end of said side walls. 23, and 24, I continue safety walls, 28. which preferably incline inwardly, at 29, toward the rolls, 11, and extend forwardly on each side thereof, as indicated in Fig. 2. At each side of said safety walls I provide platforms, 30, a portion, 31, of each of which may be hinged and flexibly supported, as by chains, 32, so that when drawn vertically they serve as guards for the operator, who stands on the platform. I obtain power for operating said feeder through an ordinary shaft, 35, having a pulley, 36, which forms a part of the shredding machine for operating the internal mechanisms thereof, and upon such shaft I mount a friction wheel, 37. Adjacent said shaft I mount a movable stud shaft, 38, in a suitable support, 39, on the shredder, its movement being controlled by a spring, 40, held in said support by a stop, 41, and provide said stud shaft with a pulley, 43, adapted to contact with said friction wheel, 37, and with a sprocket, 49, which through a chain, 44, communicates with a sprocket, 45, on said carrier. At each side of the machine I secure rods, 46, which extend downwardly and connect with a rod, 47, arranged transversely of the shredder, to which rods, 46, are secured treadles, 48, communicating with shaft, 38.

In the operation of my improved feeder two operators are usually employed, who stand on platforms, 30. The hoist, 12, with which the side walls, 23 and 29 communicate, is set in motion and elevates a shock at either side of the machine as desired, the operator at that side releasing hook 27, so that a hinged member or gate, 24, may be lowered to permit the shock to swing inwardly to be deposited on the carrier, 21, and said gate then returned to its original position to act as a retaining wall, the spring 26 assisting the operator in controlling the movements of said gate, after which either of the operators depresses a treadle, 48, causing pulley, 42, to operatively contact with friction wheel, 37, the latter through shaft 35, imparting rotary motion to said pulley and consequently shaft 38, which causes sprocket-chain 44 to actuate carrier 20, which, traveling in a forward direction, conveys the shock toward the rolls, 11, when the treadle is released and the shock remains stationary.

While I have specifically described an arrangement of mechanisms, and the operation thereof, for actuating the carrier portion of my improved feeder, I do not desire to be understood as limiting myself thereto for, as is obvious, any suitable mechanism for the purpose may be employed.

As a shock is being stripped and fed, the operators occasionally depress the treadle so that the material is constantly being advanced, either continuously or intermittently. As the material of one shock is being fed the hoist mechanism is actuated to elevate another shock and deposit the same on the feeder, which follows and is advanced gradually as the forward shock is being fed, in which manner the carrier is kept supplied at all times, and I am thus enabled to have sufficient material constantly in position adjacent the shredder rolls to be fed continuously thereinto. As will be readily understood, by confining the material within the retaining walls, and inclining a portion of the safety walls as indicated in Fig. 2, such material is constantly directed toward the rolls, thus insuring that all the material will be conveyed within convenient reach of the operator. By inclining carrier, 20, in the manner indicated in Fig. 2 the shocked material which is gradually being advanced has a tendency to lean slightly rearwardly, so that the butt ends of the stalks are first presented to the operators, which facilitates the work of feeding to the rolls, as the stalks are in proper position to be readily grasped and thrust butt end forwardly into said rolls. My improved feeding arrangement is further of importance in that the operators are kept from accidental contact with the rolls by the safety walls, 23. By being stationed on the platforms, which are lower than the material, they are enabled to handle material expeditiously without stooping or turning from side to side, as they occupy a position in relation to the oncoming material which keeps the work at all times before them, which is of material advantage in the operation of husking and shredding corn with machinery of large capacity, when it is understood that as ordinarily performed the work is unusually laborious, necessitating constant stooping to lift the material, turning with the same, and conveying it to the rolls.

By my improved feeder also, it will be understood that scattered fodder, which to more or less extent usually falls to the ground about the feeding end of a shredder can be forked to the carrier, which readily conveys the same to the rolls and is thus self-cleaning.

I claim as my invention:

1. A feeder for shredders comprising a carrier, yieldingly mounted shock retaining walls at the sides thereof capable of being lowered to permit a suspended corn shock to swing within said walls onto said carrier and to be raised to retain said shock thereon, safety walls extending forwardly of said retaining walls, and means under control of an operator for actuating said carrier to propel shocked material to within his reach.

2. A feeder for shredders comprising a carrier, yieldingly mounted shock retaining walls at the sides thereof capable of being lowered to permit a suspended shock to swing within said walls onto said carrier and to be raised to retain said shock thereon, safety walls extending forwardly and inwardly from said retaining walls, and means under control of an operator for actuating said carrier to propel shocked material toward the feeding rolls of a shredder.

3. A feeder for shredders comprising a carrier, inclosing side and end walls for said carrier said side walls being yieldingly mounted to permit the entrance of shocks therethrough to said carrier, means for controlling the movement of said side walls, and means for actuating said carrier to convey material to a shredder.

4. In a feeder for shredders, a shock-retaining receptacle comprising an end wall and yieldingly mounted side walls communicating therewith, said side walls being capable of adjustment to permit a suspended corn shock to swing within and be retained in standing position within said walls, a carrier positioned at the lower portion of said receptacle and constituting the floor thereof, and means for actuating said carrier to convey shocks from said receptacle to be shredded.

5. In a feeder for shredders, a shock retaining receptacle comprising an end wall, side walls communicating therewith and having their upper portions yieldingly mounted, to permit a suspended corn shock to swing within and be retained in standing position within said walls, a movable carrier forming a bottom for said receptacle and upon which shocks are positioned in standing position, and means for actuating said carrier to convey shocks from said receptacle.

6. A feeder for shredders, comprising a corn shock carrier, shock retaining walls at the sides thereof, protective walls associated with said retaining walls and inclosing the feeding rolls of a shredder, and means for actuating said carrier to convey material toward said rolls.

In testimony whereof I affix my signature in presence of two witnesses.

JAMES B. SCHUMAN.

Witnesses:
  C. E. SLOAN,
  LEE R. GARBER.